United States Patent
Gamsa et al.

(10) Patent No.: US 10,339,244 B1
(45) Date of Patent: Jul. 2, 2019

(54) METHOD AND APPARATUS FOR IMPLEMENTING USER-GUIDED SPECULATIVE REGISTER RETIMING IN A COMPILATION FLOW

(71) Applicant: Altera Corporation, San Jose, CA (US)

(72) Inventors: Benjamin Gamsa, Toronto (CA); Gordon Raymond Chiu, North York (CA)

(73) Assignee: Altera Corporation, San Jose, CA (US)

( * ) Notice: Subject to any disclaimer, the term of this patent is extended or adjusted under 35 U.S.C. 154(b) by 825 days.

(21) Appl. No.: 14/595,375

(22) Filed: Jan. 13, 2015

(51) Int. Cl.
*G06F 17/50* (2006.01)

(52) U.S. Cl.
CPC ...... *G06F 17/5054* (2013.01); *G06F 17/5059* (2013.01)

(58) Field of Classification Search
CPC ............... G06F 17/505; G06F 17/5045; G06F 17/5077; G06F 17/5054; G06F 17/5072; G06F 17/5081; G06F 17/5022; G06F 17/5031; G06F 17/504; G06F 2217/78; G06F 8/70
USPC ................................................. 716/100–109
See application file for complete search history.

(56) References Cited

U.S. PATENT DOCUMENTS

| | | | | |
|---|---|---|---|---|
| 8,296,695 B1 * | 10/2012 | Chen | ...................... | G06F 17/505 703/16 |
| 8,504,970 B1 * | 8/2013 | Malhotra | ............ | G06F 17/5031 716/108 |
| 2006/0075180 A1 * | 4/2006 | Tian | .................... | G06F 17/5045 711/1 |

* cited by examiner

*Primary Examiner* — Binh C Tat
(74) *Attorney, Agent, or Firm* — Compass IP Law PC

(57) ABSTRACT

A method for designing a system on a target device includes performing speculative register retiming with speculative changes made to a design of the system after an initial compilation of the design. A strategy is generated for an actual register retiming in response to user specified preferences on the speculative changes.

19 Claims, 9 Drawing Sheets

METHOD AND APPARATUS FOR IMPLEMENTING USER-GUIDED SPECULATIVE REGISTER RETIMING IN A COMPILATION FLOW

FIELD

Embodiments of the present invention relate to tools for designing systems on target devices. More specifically, embodiments of the present invention relate to a method and apparatus for implementing user-guided speculative register retiming in a compilation flow.

BACKGROUND

Target devices such as field programmable gate arrays (FPGAs), application specific integrated circuits (ASICs), and structured ASICs are used to implement large systems that may include million of gates and megabits of embedded memory. The complexity of a large system often requires the use of electronic design automation (EDA) tools to create and optimize a design for the system onto physical target devices. Among the procedures performed by EDA tools in a computer aided design (CAD) compilation flow are design generation and integration, synthesis, placement, and routing of the system on the target device.

When addressing conventional timing closure, designers focus on the critical paths in a design. A critical path is a path from a register to another register, through combinational or routing elements, which fails or is close to failing a timing requirement. In an effort to close timing, a designer may examine the critical path and attempt to improve it by reducing an amount of combinational or routing delay along the path.

EDA tools may utilize register retiming algorithms in order to close timing. Register retiming is a synchronous circuit transformation that is used to improve the speed-performance of a synchronous circuit. Register retiming involves moving register across combinational or routing circuit elements in order to reduce the length of timing-critical paths. The combinational structure remains unchanged and the observable behavior of the circuit is identical to the original circuit.

SUMMARY

A register retiming analysis is disclosed that provides users with recommended changes for a circuit design to improve a retimed performance during speculative register retiming. The register retiming analysis allows the user to provide feedback regarding which speculative changes the user wishes to make and which speculative changes the user does not wish to make to the circuit design. The register retiming analysis uses this information to determine whether other speculative change strategies should be employed during a next iteration of speculative register retiming. The recommended changes accepted by the user are forwarded to a compiler to allow synthesis, placement, and routing to implement the accepted changes or to assume that the accepted changes would be made for the purpose of performing optimization during the analysis. The register retiming analysis allows the user to explore the benefits of the recommended changes without having to manually modify the code for the design. After timing analysis is completed, a final report may be generated that identifies actual changes to be made to the design.

According to an embodiment of the present invention, a method for designing a system on a target device includes performing speculative register retiming with speculative changes made to a design of the system after an initial compilation of the design. A strategy is generated for an actual register retiming in response to user specified preferences on the speculative changes. According to an aspect of the present invention, the user specified preferences on the speculative changes may be used to perform a second speculative register retiming. According to another aspect of the present invention, the strategy for the actual register retiming includes removing restrictions for the actual register retiming, and actual changes to the design are implemented in response to the strategy prior to performing a subsequent compilation of the design.

According to another embodiment of the present invention, a method for designing a system on a target device includes identifying restrictions in a design that limit register retiming. The design is speculatively modified by applying speculative changes to eliminate the restrictions without modifying a register transfer level (RTL) netlist of the design. Register retiming is performed without the restrictions. A report is generated that identifies the speculative changes made to the design and performance attained with the register retiming with the speculative changes.

BRIEF DESCRIPTION OF THE DRAWINGS

The features and advantages of embodiments of the present invention are illustrated by way of example and are not intended to limit the scope of the embodiments of the present invention to the particular embodiments shown.

DETAILED DESCRIPTION

Figure 1:
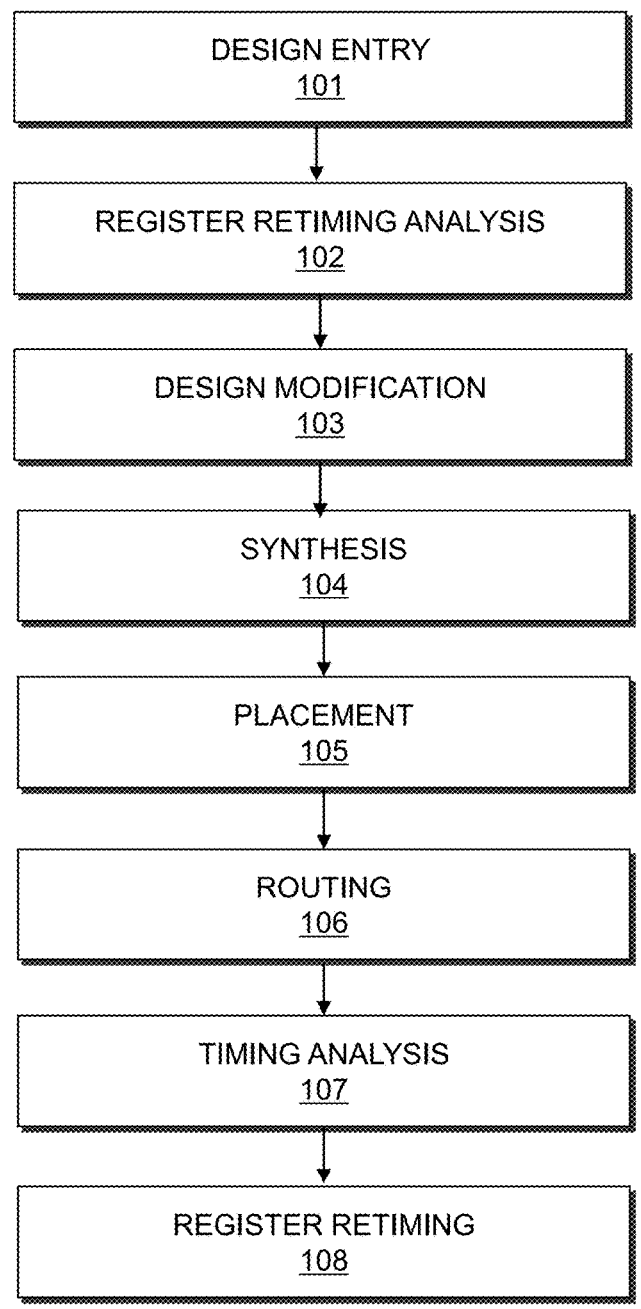
FIG. 1 is a flow chart illustrating a method for designing a system on a target device according to an exemplary embodiment of the present invention.

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, procedures, and programs are shown in block diagram form to avoid obscuring embodiments of the present invention unnecessarily.

FIG. 1 is a flow chart illustrating a method for designing a system on a target device according to an exemplary embodiment of the present invention. The target device may be a field programmable gate array (FPGA), application specific integrated circuit (ASIC), a structured ASIC, or other programmable device. According to one embodiment, the procedure illustrated in FIG. 1 may be performed by a computer aided design (CAD)/electronic design automation (EDA) tool implemented on a computer system.

At 101, a design for a system is entered. The specification for the system may be provided though a design entry tool. The specification may describe components and interconnections in the system. According to an embodiment of the present invention, the design entered may be in register transfer level (RTL) in a hardware description language (HDL).

At 102, register retiming analysis is performed. According to an embodiment of the present invention, an initial compilation is performed on the design that includes synthesis, placement, routing, and timing analysis. After the initial compilation, speculative register retiming is performed where speculative changes are made to the design in order to improve a retimed performance of the design. User provided feedback regarding which speculative changes are acceptable is used to determine whether other speculative change strategies should be employed during the analysis, and what actual changes should be implemented for the design to improve actual register retiming.

At 103, modifications are made to the design. The modifications are made to the design in response to the register timing analysis in order to improve register retiming. According to an embodiment of the present invention, a final report is generated during register retiming analysis that identifies a strategy for actual modifications to be made to the design in order to achieve desired results. The user feedback from the register retiming analysis is used to generate the strategy for the modifications. According to an embodiment of the present invention, the modifications may be made automatically to the design that are inline with the speculative changes accepted by the user during register retiming analysis, without any further intervention by the user. Alternatively, the modifications may be made to the design by the user. The modifications involve modifying the RTL netlist of the design to implement the speculative changes as actual changes.

At 104, the design for the system is synthesized. The design for the system is the design entered at 101. Synthesis includes generating a logic design of the system to be implemented by the target device. According to an embodiment of the present invention, synthesis generates an optimized logical representation of the system from an HDL design definition. The optimized logical representation of the system may include a representation that has a minimized number of functional blocks such as logic gates, logic elements, and registers required for the system. Synthesis also includes mapping the optimized logical representation. Mapping includes determining how to implement logic gates and logic elements in the optimized logic representation with the types or categories of resources available on the target device. The resources available on the target device may be referred to as "cells" or "components" and may include logic-array blocks, registers, memories, digital signal processing blocks, input output elements, and other components. According to an embodiment of the present invention, a netlist is generated from mapping. This netlist may be an optimized technology-mapped netlist generated from the HDL.

At 105, the system is placed. According to an embodiment of the present invention, placement involves placing the technology-mapped logical system design on the target device. Placement includes fitting the system on the target device by determining which specific resources on the target device are to be assigned to and implemented by the technology-mapped netlist determined during synthesis. Placement may include clustering which involves grouping logic elements together to form the logic clusters present on the target device.

At 106, the placed design is routed. During routing, routing resources on the target device are allocated to provide interconnections between logic gates, logic elements, and other components on the target device. Routability optimization may also be performed on the placed logic design. According to an embodiment of the present invention, the goal of routability optimization is to reduce the amount of wiring used to connect components in the placed logic design. Routability optimization may include performing fanout splitting, logic duplication, logical rewiring, or other procedures. It should be appreciated that one or more of the procedures may be performed on the placed logic design.

At 107, timing analysis is performed on the design of the system generated. According to an embodiment of the present invention, the timing analysis determines whether timing constraints of the system are satisfied. The timing analysis may utilize approximations depending on when it is performed. According to an embodiment of the present invention, timing analysis establishes a length for each path in the system as well as the slack for each path in the system. Slack may be defined to be the amount of delay that can be added to a path before it becomes critical or required time for signal arrival minus actual time of signal arrival.

At 108, register retiming is performed on the system. According to an embodiment of the present invention, register retiming involves moving identified registers across combinational or routing circuit elements to reduce the length of timing-critical or near critical paths as determined by the timing analysis procedure 107.

According to an embodiment of the present invention, further analysis may be performed on the design after register retiming 108. For example, if the design does not meet timing requirements, the user may review a report to determine what is limiting performance and/or return to 102 to repeat register retiming analysis and the remainder of the flow. In an alternate embodiment, if the design does not meet timing requirements, register retiming 108 may be repeated until desired results are achieved.

Figure 2:
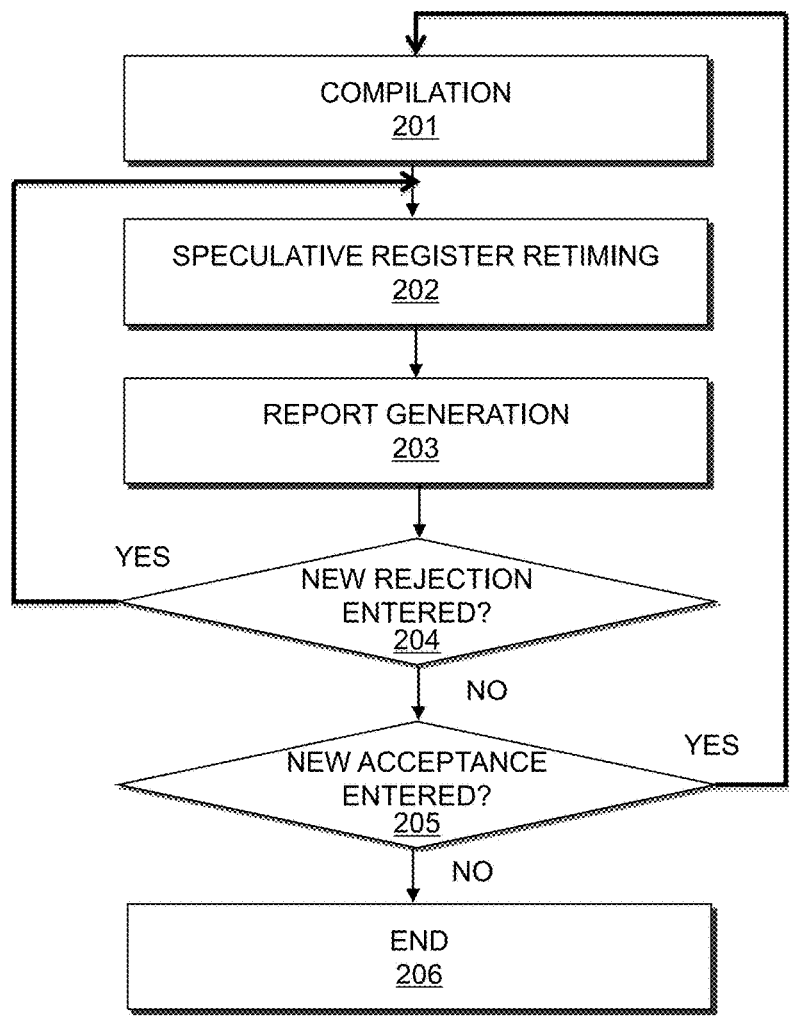
FIG. 2 is a flow chart illustrating a method for performing register retiming analysis according to an exemplary embodiment of the present invention.

FIG. 2 is a flow chart illustrating a method for performing register retiming analysis according to an exemplary embodiment of the present invention. The method illustrated in FIG. 2 may be used to implement procedure 102 shown in FIG. 1. At 201, an initial compilation of a design for a system is performed. According to an embodiment of the present invention, the compilation includes performing synthesis, placement, routing, and a timing analysis on the design. The compilation may perform the full set of procedures for synthesis, placement, routing, and timing analysis as described with reference to 104-107 as described with reference to FIG. 1. Alternatively, the compilation may perform a subset of the actions for synthesis, placement, routing, and timing analysis described with reference to 104-107.

At 202, speculative register retiming is performed on the design. Speculative register retiming modifies constructs in the design that restricts or hinders register retiming to improve retimed result for the system. The speculative changes that are implemented for the modifications to the design are made in response to feedback provided by a user on speculative changes made during a prior iteration of speculative register retiming. During an initial iteration of speculative register retiming where user feedback is unavailable, speculative register retiming may be performed using a predefined set of speculative actions according to a preset priority. According to an embodiment of the present invention, the predefined set of speculative actions may be performed according to the following order. First, asynchronous clears are removed and/or converted to synchronous clears. Second, user directives are removed. Third, pipelining is added by adding registers to either side of an asynchronous clock transfer.

At 203, a report is generated for the user. The report identifies speculative changes made to the design and the performance attained with register retiming with the speculative changes. According to an embodiment of the present invention, the report identifies different levels of attainable performance based on different levels of design changes. The report may also identify for each clock, the achievable performance for different levels of effort in terms of both the number and types of speculative changes required, and recommended changes required to achieve an estimated maximum frequency. The report may be presented to the user via a graphical user interface (GUI), a text file, and/or other medium or mechanism.

At 204, it is determined whether a new rejection of a speculative change has been entered. If a new rejection of a speculative change has been entered, control returns to 202. If a new rejection has not been entered, control proceeds to 205. According to an embodiment of the present invention, a new rejection of a speculative change is entered when a user rejects a speculative change from the speculative register retiming. When a new rejection to a speculative change is entered, the user feedback is utilized during a next iteration of speculative register retiming. The user feedback guides the next iteration of speculative register retiming to select a strategy for removing retiming restrictions other than the one previously rejected by the user.

At 205, it is determined whether a new acceptance has been entered. If a new acceptance has been entered, control returns to 201. If a new acceptance has not been entered control proceeds to 206. According to an embodiment of the present invention, a new acceptance of a speculative change is entered when a user accepts a speculative change from the speculative register retiming. When a new acceptance to a speculative change is entered, the user feedback is utilized during a next iteration of compilation to allow synthesis, placement, and routing to implement the accepted changes or to assume that the accepted changes would be made for the purpose of performing optimization.

The user feedback as determined from 204 and 205 may be provided back to a speculative register retiming procedure or a compilation procedure via one or more different mechanisms. For example, a GUI may be utilized where a user selects recommendations provided by speculative register retiming procedure and selects either an accept or reject option. A text file may be generated where names of design elements are associated with an accept or reject option. A script may be utilized that iterates over elements of the design and issues commands as to a desired behavior for each element. It should be appreciated that other mechanisms may also be used. The user may also provide further specific directions for an accepted speculative change such as a specific quantity of registers to add for pipelining.

At 206, control terminates the procedure. According to an embodiment of the present invention, a final report is generated that identifies a strategy for actual modifications for the design in response to the user feedback provided at 204 and 205.

As illustrated in FIG. 2, speculative register retiming is performed after a full compilation has completed. This provides improve accuracy for determining the effect of retiming, ensuring the benefits of retiming are realized. According to an embodiment of the present invention, when making speculative changes, the original netlist need not be modified. Instead, adjustments may be made to its model to reflect the effect of the changes.

Figure 3:
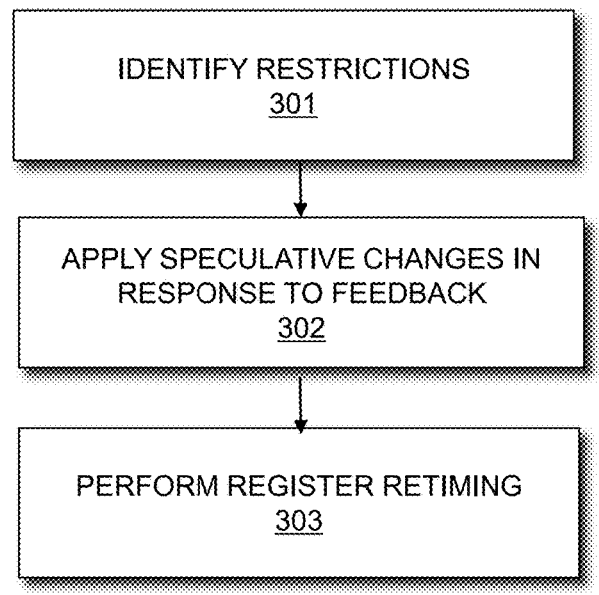
FIG. 3 is a flow chart illustrating a method for performing speculative register retiming according to an exemplary embodiment of the present invention.

FIG. 3 is a flow chart illustrating a method for performing speculative register retiming according to an exemplary embodiment of the present invention. The method illustrated in FIG. 3 may be used to implement procedure 202 shown in FIG. 2. At 301, restrictions to register retiming in the design are identified. Restrictions to register retiming may include any construct in the design that limit the ability to retime. An example of a restriction to register retiming may be a particular register's inability to support a type of functionality, where the particular register is to be used for retiming another register that utilizes the functionality. According to an aspect of the present invention, the functionality may be the ability to support asynchronous clears. Another example of a restriction to register retiming is a user directive that prohibits or limits movement of a register that should be moved for retiming. It should be appreciated that other restrictions may also be identified.

According to an embodiment of the present invention, speculative changes on the design that would improve register retiming performance may also be identified. For example, additional pipelining at asynchronous clock crossings may be provided. Read/write timing relationships on dual-port RAMs may be adjusted. Additional pipelining may be provided on an edge that is marked as a false-path, indicating that the user does not care about timing along the edge. Internal pipelining on RAMs and DSPs may be increased. Registers that are the target of a cross-clock transfer may be allowed to move.

At 302, speculative changes are applied to the design. According to an embodiment of the present invention, the speculative changes are applied to remove restrictions to register retiming and/or improve register retiming performance where register retiming is needed to reduce the criticality of a path. The speculative changes are applied to the design according to user specified preferences on speculative changes made in a prior iteration of speculative register retiming. The user specified preferences include user feedback as to which speculative changes are acceptable and which speculative changes are not acceptable. According to an embodiment of the present invention where speculative register retiming is performed a first time and no user specified preferences are available, a predefined set of speculative changes may be performed according to a preset priority. According to an embodiment of the present invention, the predefined set of speculative actions may be performed according to the following order. First, asynchronous clears are removed and/or converted to synchronous clears. Second, user directives are removed. Third, pipelining is added by adding registers to either side of an asynchronous clock transfer.

At 303, register retiming is performed on the changed design. Register retiming may be performed using the procedures described with reference to 109 in FIG. 1. Alternatively, register retiming may perform a subset of the actions described in 109.

Embodiments of the present invention allow speculative register retiming to be performed with the guidance of user feedback. When faced with a path that cannot be retimed, speculative register retiming may have a plurality of options of speculative changes that can be made to allow retiming to proceed. Instead of allowing speculative register retiming to select an option that may undermine an optimization achieved during a previous compilation, user feedback may be used to select an ideal option. Embodiments of the present invention allow the user to guide the compilation and speculative register retiming by indicating which speculative actions will be implemented and which speculative actions will not be implemented in future modifications of the design. Future iterations of compilation, during register retiming analysis, may perform optimizations based on the changes the will be made, and future iterations of speculative register retiming may avoid speculating changes that will not be made. According to an embodiment of the present invention, user feedback may be provided in a format other than and independent of source RTL. This allows the user to better explore the benefits of the speculative changes without needing to modify the code.

Figure 4:
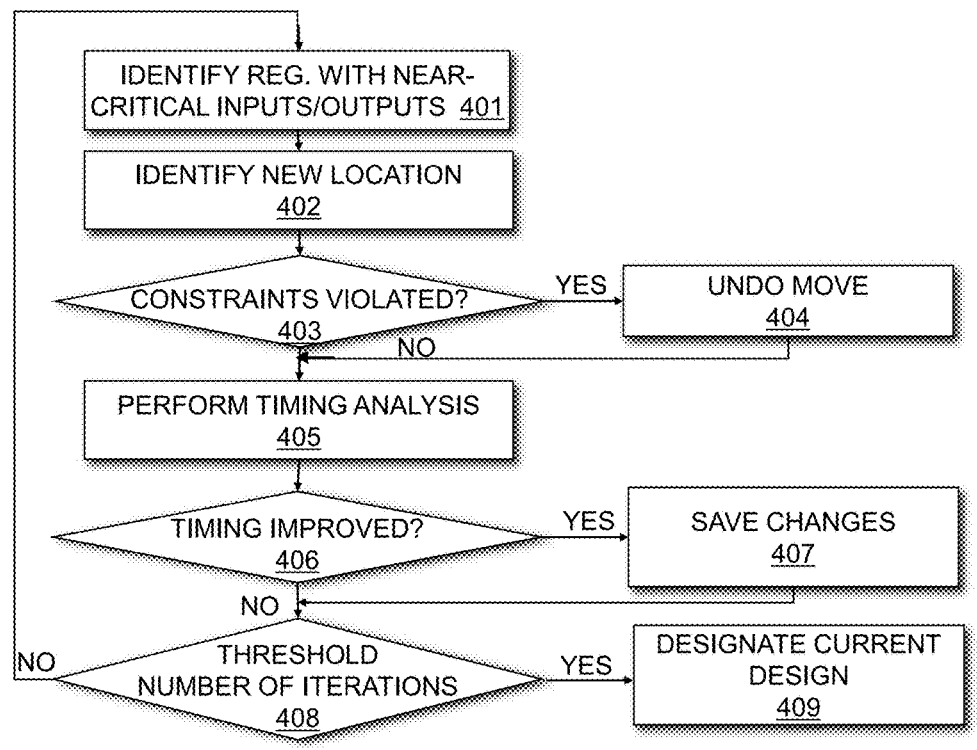
FIG. 4 illustrates a method for performing register retiming according to an exemplary embodiment of the present invention.

FIG. 4 is a flow chart illustrating a method for performing register retiming according to an exemplary embodiment of the present invention. The method illustrated in FIG. 4 may be used to implement 109 shown in FIG. 1, and 303 shown in FIG. 3. It should be appreciated that other methodologies may also be used to implement 109 and 303. At 401, registers with inputs connected to near-critical paths are identified and registers with outputs coupled to near-critical paths are identified. According to an embodiment of the present invention, a near-critical path is a path in the system with a slack value below a threshold value.

At 402, the identified registers at 401 are moved to new locations. According to an embodiment of the present invention, a new location may be identified for each identified register by moving the register backwards on the near-critical path to an input of a component. For the backward push to occur, the register needs to be present on each fanout of the component. According to an embodiment of the present invention, a new location may be identified by moving the register forward on the near-critical path to an output of a component. For the forward push to occur, the register needs to be present on each input of the component. According to an alternate embodiment of the present invention, a new location may be identified for the register by solving a plurality of equations with constraints to reduce criticality.

At 403, for each register moved, it is determined whether moving the registers to its new location at 402 causes a violation of a constraint. According to an embodiment of the present invention, constraints may include user-defined timing constraints. Constraints may include area constraints for the system such as global constraints on the maximum area increase allowed and constraints that ensure that registers are created evenly across the system. Constraints may include architectural constraints that define rules for handling carry chains and various restrictions on secondary signals such as control signals. Constraints may include user defined constraints such as constraints that prohibit the placement of components on designated sections of the target device. It should be appreciated that other types of constraints may also be defined and included for the purpose of determination of violation at 403. If it is determined that moving a register to its new location causes a violation of a constraint, control proceeds to 404. If it is determined that moving a registers to its new location does not cause a violation of a constraint, control proceeds to 405.

At 404, moves that result in violations are undone. Control proceeds to 405.

At 405, timing analysis is performed. Timing analysis establishes the length for each path in the system as well as the slack for each path in the system.

At 406, it is determined whether the timing of the system has improved. Determining whether timing of the system has improved may be achieved by comparing the slack values of near-critical paths in the recently retimed system design with a previous system design. If the timing of the system has improved, control proceeds to 407. If the timing of the system has not improved, control proceeds to 408.

At 407, the current changes to the system are saved. The current changes to the system include the changes made at 402.

At 408, it is determined whether a threshold number of iterations of 401-407 has been performed. If a threshold number of iterations of 401-407 has not been performed, control returns to 401. If a threshold number of iterations of 401-407 has been performed, control proceeds to 409.

At 409, the current changes saved at 407 are designated as the current design for the system.

According to an embodiment of the present invention, the procedures illustrated in FIGS. 1-4 may be performed by an EDA tool executed on a first computer system. A data file may be generated and transmitted to a second computer system to allow the design of the system to be further processed. Alternatively, the data file may be transmitted to a second computer system which may be used to program the target device according to the system design. It should be appreciated that the design of the system may also be output in other forms such as on a display device or other medium. By programming the target with the data file, components on the target device are physically transformed to implement the system.

FIGS. 1-4 are flow charts that illustrate embodiments of the present invention. The procedures described in these figures may be performed by an EDA tool implemented by a computer system. Some of the techniques illustrated may be performed sequentially, in parallel or in an order other than that which is described and that the procedures described may be repeated. It is appreciated that not all of the techniques described are required to be performed, that additional techniques may be added, and that some of the illustrated techniques may be substituted with other techniques.

Figure 5A:
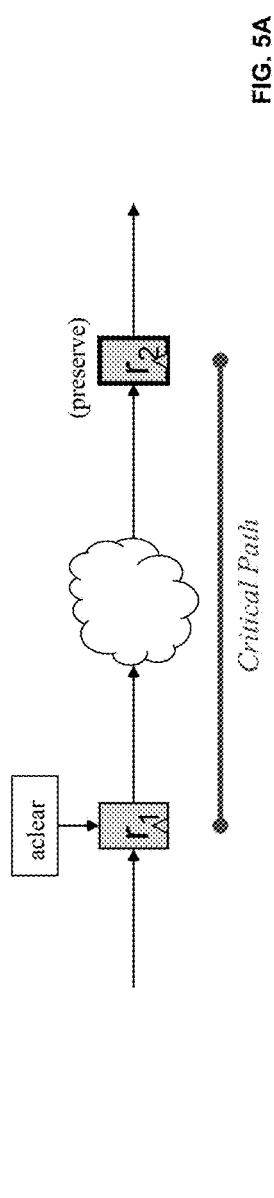
FIGS. 5A-5C illustrate examples of various decisions that may be made during user-guided speculative register retiming according to an exemplary embodiment of the present invention.
Figure 5B:
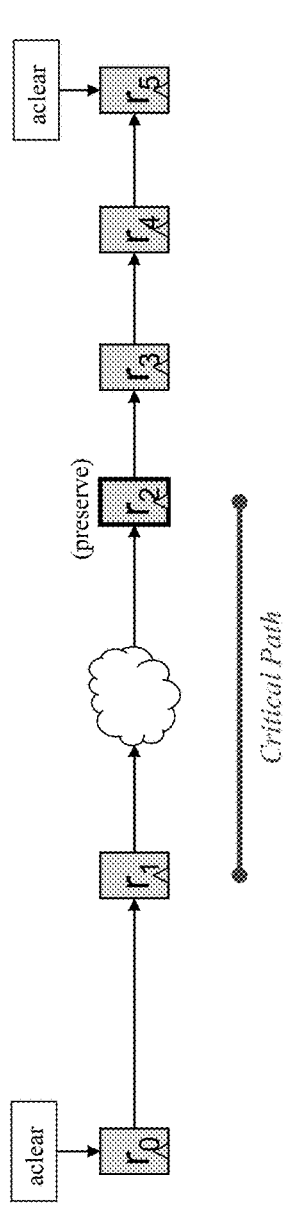
Figure 5C:
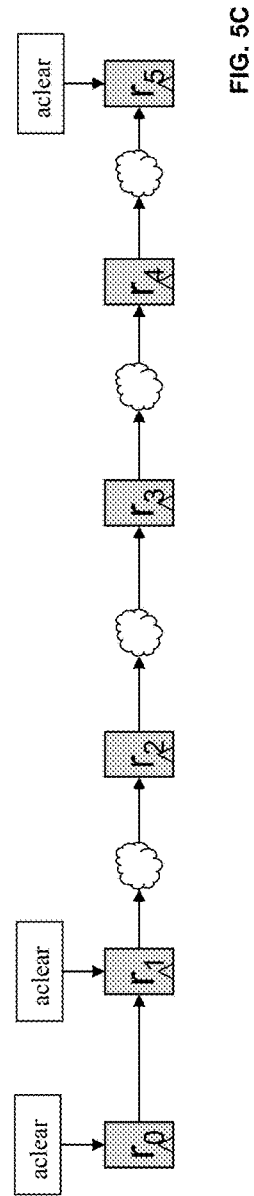

FIGS. 5A-5C illustrate an example of various decisions that may be made during user-guided speculative register retiming according to an exemplary embodiment of the present invention. FIG. 5A illustrates a signal path. The signal path traverses registers r1 and r2 and is critical. Register retiming cannot be performed to move register r1 because register r1 utilizes an asynchronous clear functionality that is not available on registers that may be used for retiming. Register retiming cannot be performed to move register r2 because a user preserve directive to not move register r2 exists.

There are a number of options for removing the register retiming restrictions on the path. The design may be modified so that an asynchronous clear is removed and no longer fed to register r1. Alternatively, the asynchronous clear on register r1 may be converted to a synchronous clear. Other options include removing the preserve directive on register r2, and adding one or more registers between registers r1 and r2.

Speculative register retiming may by default initially select to remove the asynchronous clear. Modifying the design to remove the asynchronous clear may be difficult for a user, and the user may prefer to convert the asynchronous clear to a synchronous clear. Alternatively, the user might prefer to remove the preserve directive. Although the immediate improvement for the different options might yield a similar result, each option might affect other speculative changes which collectively create a cascade of different speculations.

FIG. 5B illustrates that after removing an asynchronous clear from register r1, the path from r1 to r2 might still be critical due to restrictions on the proceeding register r0. To address the critical path, the asynchronous clear from register r0 and possibly other registers preceding r0 may be required. As shown in FIG. 5C, if the directive on register r2 was removed, register retiming would be able to move register r2 to r4. This might be sufficient to eliminate the complete chain of registers r0 to r5 from the list of critical paths. As shown in FIGS. 5A-5C, many options may exist for removing a restriction to register retiming. Each option selected may impact the design differently. Embodiments of the present invention allow user feedback to specify which speculative changes are acceptable and which speculative changes are to be rejected in order to guide speculative register retiming to yield the most desired result.

Figure 6A:
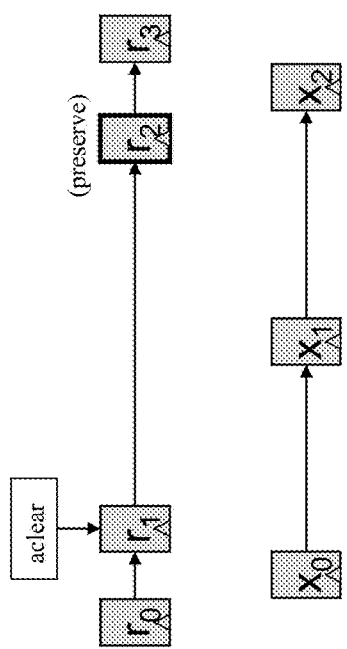
FIGS. 6A and 6B illustrate an example of the impact of user-guided speculative register retiming according to an exemplary embodiment of the present invention.
Figure 6B:
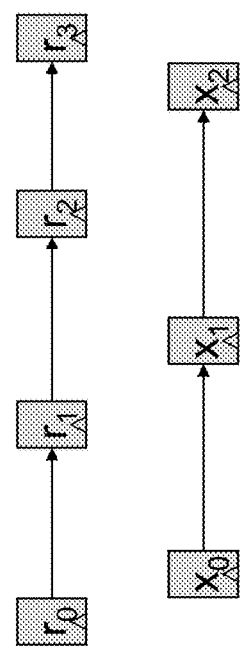

FIGS. 6A and 6B illustrate an example of the impact of user-guided speculative register retiming according to an exemplary embodiment of the present invention. FIG. 6A illustrates a first path between register r1 and r2. During compilation, the path between r1 and r2 is believed to be the most critical. As a result, registers r1 and r2 will be placed closer together due to the criticality of the path. The placement of r1 and r2 may be given priority over the placement of other paths, including the second path illustrated at the bottom of FIG. 6A. The second path in FIG. 6A traverses registers x0, x1, and x2, and is also critical, but to a lesser degree than the first path.

FIG. 6B illustrates the first and second paths after an iteration of speculative register retiming. The removal of the asynchronous clear from register r1 and the user directive from register r2 allows successful register retiming on the first path and reduces the path's criticality. After these new speculative changes have been accepted by a user, a next iteration of compilation will prioritize the placement of registers x0, x1, and x2. Since it is known that the first path with registers r1 and r2 can successfully be retimed, the placement of registers x0, x1, and x2 on the second path will be given top priority.

Figure 7:
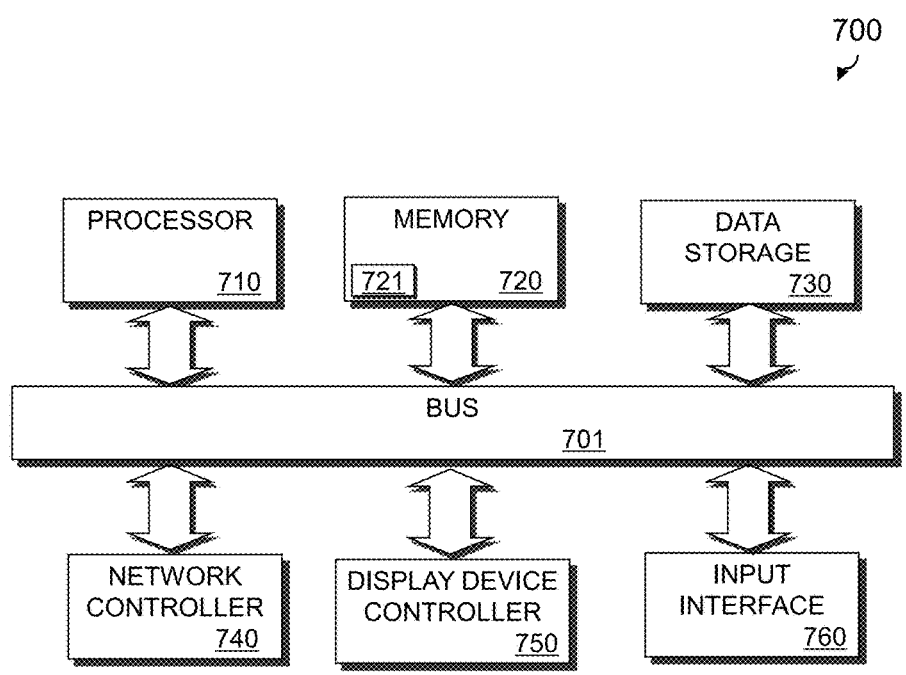
FIG. 7 illustrates a block diagram of a computer system implementing a system designer according to an embodiment of the present invention.

FIG. 7 is a block diagram of an exemplary computer system 700 in which an example embodiment of the present invention resides. The computer system 700 includes a processor 710 that process data signals. The processor 710 is coupled to a bus 701 or other switch fabric that transmits data signals between processor 710 and other components in the computer system 700. The computer system 700 includes a memory 720. The memory 720 may store instructions and code represented by data signals that may be executed by the processor 710. A data storage device 730 is also coupled to the bus 701

A network controller 740 is coupled to the bus 701. The network controller 740 may link the computer system 700 to a network of computers (not shown) and supports communication among the machines. A display device controller 750 is coupled to the bus 701. The display device controller 750 allows coupling of a display device (not shown) to the computer system 700 and acts as an interface between the display device and the computer system 700. An input interface 760 is coupled to the bus 701. The input interface 760 allows coupling of an input device (not shown) to the computer system 700 and transmits data signals from the input device to the computer system 700.

A system designer 721 may reside in the memory 720 and be executed by the processor 710. According to an embodiment of the present invention, the system designer includes a register retiming analysis unit that performs speculative register retiming with speculative changes made to a design of the system after an initial compilation of the design, and generates a strategy for an actual register retiming in response to user specified preferences on the speculative changes. The system designer also includes a design modification unit that modifies the design in response to the strategy. The design modification unit may automatically modify the design in response to the strategy without user intervention. Alternatively, the design modification unit may modify the design in response to feedback solicited from the user. The system designer also includes a compilation unit that synthesizes, places, routes, and performs register retiming on the modified design.

Figure 8:
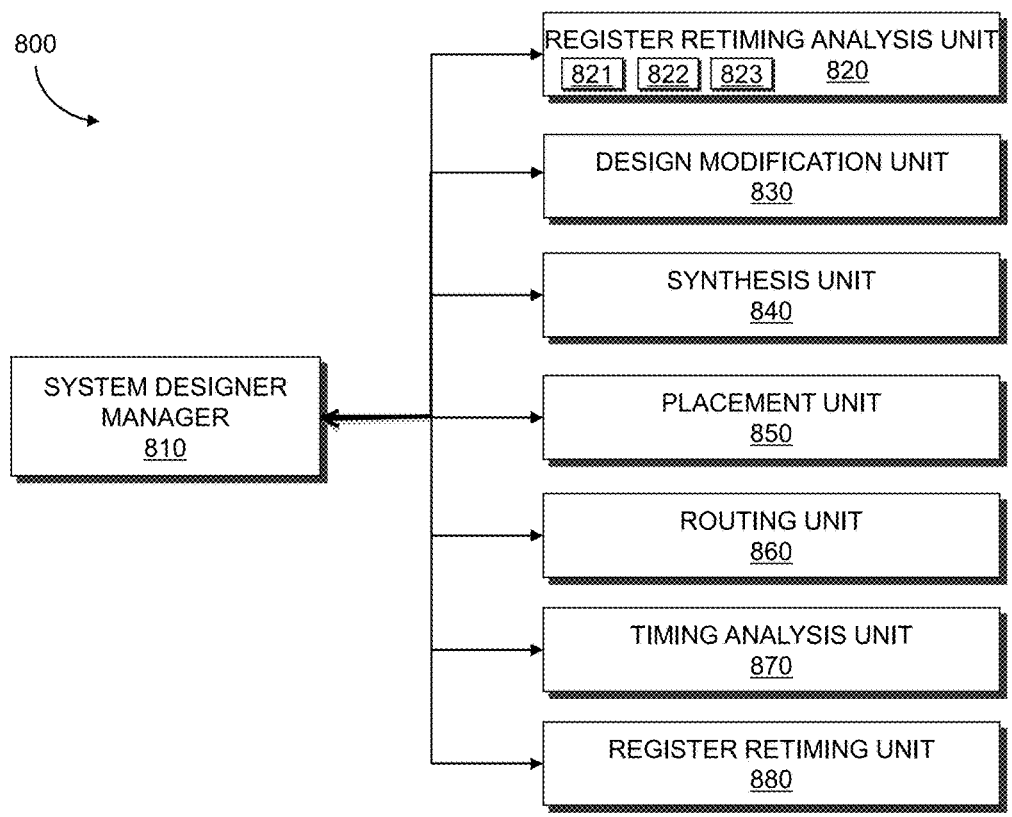
FIG. 8 is a block diagram of a system designer according to an embodiment of the present invention.

FIG. 8 illustrates a system designer 800 according to an embodiment of the present invention. The system designer 800 may be used to implement the system designer 721 illustrated in FIG. 7. The system designer 800 may be an EDA tool for designing a system on a target device such as an FPGA, ASIC, structured ASIC, or other circuitry. FIG. 8 illustrates modules implementing an embodiment of the system designer 800. According to one embodiment, the modules represent software modules and system design may be performed by a computer system such as the one illustrated in FIG. 7 executing sequences of instructions represented by the modules shown in FIG. 8. Execution of the sequences of instructions causes the computer system to support system design as will be described hereafter. In alternate embodiments, hard-wire circuitry may be used in place of or in combination with software instructions to implement embodiments of present invention. Thus, embodiments of present invention are not limited to any specific combination of hardware circuitry and software.

The system designer 800 includes a designer manager 810. The system designer manager 810 is connected to and transmits data between the other components of the system designer 800. The system designer manager 810 provides an interface that allows a user to input data into the system designer 800 and that allows the system designer 800 to output data to the user. According to an embodiment of the present invention, a design for the system and user feedback regarding speculative changes to the design may be input using the system designer manager 810. A report regarding speculative changes made to the design and performance attained by the speculative changes as well as a final report that identifies actual changes to be made to the design may be output by the system design manager 810.

The system designer 800 includes a register retiming analysis unit 820. The register retiming analysis unit 820 includes a compilation unit 821 that performs synthesis, placement, routing, and timing analysis on the design. The register retiming analysis unit 820 includes a speculative register retiming unit 822 where speculative register retiming is performed with speculative changes made to the design in order to improve a retimed performance. User provided feedback regarding which speculative changes are acceptable is used to determine whether other speculative change strategies should be employed during the analysis, and what actual changes should be implemented for the design to improve actual register retiming. The register retiming analysis unit 820 includes a report generation unit 823 that generates a report to the user. The report may identify speculative changes made to the design and the performance attained with register retiming with the speculative changes. According to an embodiment of the present invention, the report identifies different levels of attainable performance based on different levels of design changes. The report may also identify for each clock, the achievable performance for different levels of effort in terms of both the number and types of speculative changes required, and recommended changes required to achieve an estimated maximum frequency. The register retiming analysis unit 820 may also perform the procedures described with reference to FIGS. 2-4.

The system designer 800 includes a synthesis unit 840. The synthesis unit 840 generates a logic design of the system to be implemented by the target device. According to an embodiment of the present invention, the synthesis unit 840 generates an optimized logical representation of the system from the HDL design definition and maps the optimized logic design. According to an embodiment of the present invention, a netlist is generated from mapping. This netlist may be an optimized technology-mapped netlist generated from the HDL.

The system designer 800 includes a placement unit 850. According to an embodiment of the present invention, the placement unit 850 places the mapped logical system design on the target device. Placement works on the technology-mapped netlist to produce a placement for each of the functional blocks. According to an embodiment of the present invention, placement unit 850 fits the system on the target device by determining which resources on the logic design are to be used for specific logic elements, and other function blocks determined to implement the system as determined during synthesis. Placement may include clustering which involves grouping logic elements together to form the logic clusters present on the target device.

The system designer 800 includes a routing unit 860 which routes the placed design on the target device. The routing unit 860 allocates routing resources on the target device to provide interconnections between logic gates, logic elements, and other components on the target device. The routing unit 860 may also perform routability optimization on the placed logic design.

The system designer 800 includes a timing analysis unit 870 which performs timing analysis on the design of the system generated. According to an embodiment of the present invention, the timing analysis determines whether timing constraints of the system are satisfied. The timing analysis may utilize approximations depending on when it is performed. It should be appreciated that the synthesis unit 840, placement unit 850, routing unit 860, and timing analysis unit 870 may collectively be referred to as a compilation unit, and that the compilation unit may operate as, in conjunction with, or independent of the compilation unit 821.

The system designer 800 includes a register retiming unit 880. According to an embodiment of the present invention, the register retiming unit 880 moves identified registers across combinational circuit elements to reduce the length of timing-critical or near critical paths as determined by the timing analysis unit 870. The register retiming unit 880 may perform the procedures illustrated in FIG. 4.

It should be appreciated that embodiments of the present invention may be provided as a computer program product, or software, that may include a computer-readable or machine-readable medium having instructions. The instructions on the computer-readable or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing electronic instructions. The techniques described herein are not limited to any particular software configuration. They may find applicability in any computing or processing environment. The terms "computer-readable medium" or "machine-readable medium" used herein shall include any medium that is capable of storing or encoding a sequence of instructions for execution by the computer and that cause the computer to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Figure 9:
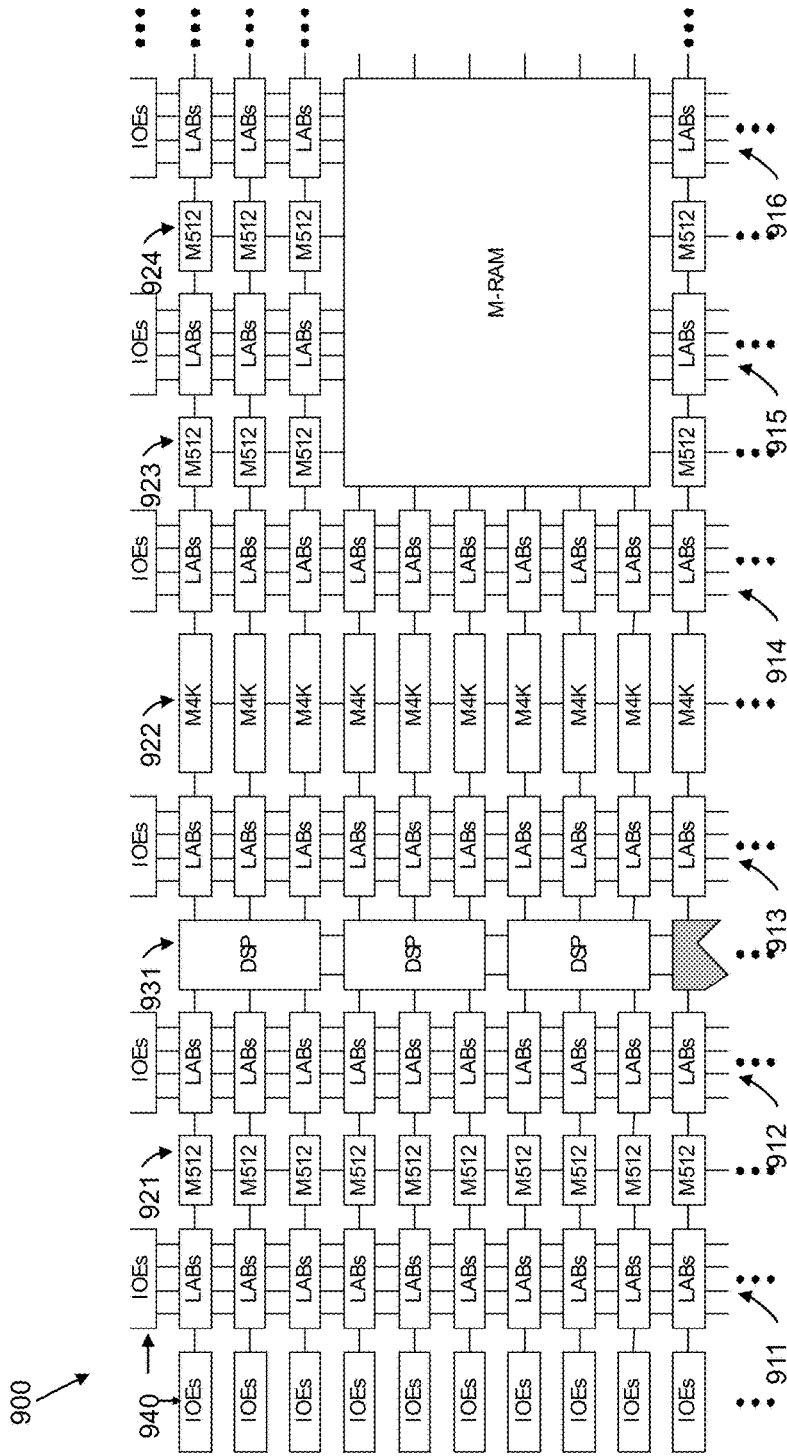
FIG. 9 illustrates an exemplary target device according to an embodiment of the present invention.

FIG. 9 illustrates a device 900 that may be used to implement a target device according to an embodiment of the present invention. The device 900 is a field programmable gate array (FPGA) that includes a plurality of logic-array blocks (LABs). Each LAB may be formed from a plurality of logic blocks, carry chains, LAB control signals, look up table (LUT) chain, and register chain connection lines. A logic block is a small unit of logic providing efficient implementation of user logic functions. A logic block includes one or more combinational cells, where each combinational cell has a single output, and registers. According to one embodiment of the present invention, the logic block may operate similarly to a logic element (LE), such as those found in the Stratix or Cyclone devices manufactured by Altera® Corporation, or a combinational logic block (CLB) such as those found in Virtex devices manufactured by Xilinx Inc. In this embodiment, the logic block may include a four input LUT with a configurable register. According to an alternate embodiment of the present invention, the logic block may operate similarly to an adaptive logic module (ALM), such as those found in Stratix devices manufactured by Altera Corporation. LABs are grouped into rows and columns across the device 900. Columns of LABs are shown as 911-916. It should be appreciated that the logic block may include additional or alternate components.

The device 900 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the device in between selected LABs or located individually or in pairs within the device 900. Columns of memory blocks are shown as 921-924.

The device 900 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the device 900 and are shown as 931.

The device 900 includes a plurality of input/output elements (IOEs) 940. Each IOE feeds an IO pin (not shown) on the device 900. The IOEs 940 are located at the end of LAB rows and columns around the periphery of the device 900. Each IOE may include a bidirectional IO buffer and a plurality of registers for registering input, output, and output-enable signals.

The device 900 may include routing resources such as LAB local interconnect lines, row interconnect lines ("H-type wires"), and column interconnect lines ("V-type wires") (not shown) to route signals between components on the target device.

In the foregoing specification, embodiments of the invention have been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method for designing a system on a target device, comprising:
    performing speculative register retiming with speculative changes made to a design of the system after an initial compilation of the design;
    generating a strategy for an actual register retiming in response to user specified preferences on the speculative changes;
    generating a data file that reflects the strategy for the design of the system; and
    programming the target device with the data file to physically transform components on the target device to implement the system.

2. The method of claim 1 further comprising performing a second speculative register retiming in response to the user specified preferences on the speculative changes.

3. The method of claim 1, wherein the strategy for the actual register retiming comprises removing restrictions for the actual register retiming.

4. The method of claim 1 further comprising implementing actual changes to the design in response to the strategy.

5. The method of claim 4 further comprising performing a subsequent compilation of the design after the actual changes to the design have been implemented.

6. The method of claim 5 further comprising performing the actual register retiming on the design after the subsequent compilation.

7. The method of claim 1, wherein performing speculative register retiming comprises:
    identifying restrictions in the design that limit register retiming;
    speculatively modifying the design by applying the speculative changes to the design to eliminate the restrictions; and
    performing the register retiming without the restrictions.

8. The method of claim 7 further comprising generating a report to a user that identifies the speculative changes and performance attained with the speculative register retiming with the speculative changes.

9. The method of claim 1, wherein performing speculative register retiming applies speculative changes in an order of 1) modifying asynchronous clears, 2) removing user directives, and 3) adding pipelining.

10. The method of 1, wherein the user specified preferences are provided via one of a graphical user interface, text file, and script.

11. A non-transitory computer readable medium including a sequence of instructions stored thereon for causing a computer to execute a method for designing a system on a target device, comprising:
    identifying restrictions in a design that limit register retiming;
    speculatively modifying the design by applying speculative changes to eliminate the restrictions without modifying a register transfer level (RTL) netlist of the design;
    performing the register retiming without the restrictions; and
    generating a report that identifies the speculative changes made to the design and performance attained with the register retiming with the speculative changes;
    compiling the design in response to speculative changes accepted by a user;
    generating a data file that reflects the compiled design of the system; and
    programming the target device with the data file to physically transform components on the target device to implement the system.

12. The non-transitory computer readable medium of claim 11, wherein the method further comprises further speculatively modifying the design by applying additional speculative changes in response to user specified preferences on the speculative changes.

13. The non-transitory computer readable medium of claim 11, wherein the compiling comprises performing synthesis, placement, and routing optimizations on the design.

14. The non-transitory computer readable medium of claim 11, wherein the method further comprises:
    identifying restrictions in the compiled design that limit a subsequent register retiming;
    speculatively modifying the compiled design by applying additional speculative changes to eliminate the restrictions in the compiled design without modifying an RTL netlist of the compiled design;
    performing the subsequent register retiming without the restrictions; and
    generating a subsequent report that identifies the additional speculative changes made to the compiled design and performance attained with the subsequent register retiming with the additional speculative changes.

15. The non-transitory computer readable medium of claim 11, wherein the method further comprises modifying the RTL netlist to implement the speculative changes as actual changes.

16. The non-transitory computer readable medium of claim 15, wherein the method further comprises performing a compilation of the design after the actual changes to the design have been implemented.

17. A system designer unit, comprising:
    a register retiming analysis unit that performs speculative register retiming with speculative changes made to a design of the system after an initial compilation of the design, and that generates a strategy for an actual register retiming in response to user specified preferences on the speculative changes;
    a design modification unit that modifies the design in response to the strategy; and
    a compilation unit that synthesizes, places, routes, performs register retiming on the modified design, generates a data file that reflects the synthesized, placed, routed, and register retimed modified design of the system, and that programs the target device with the data file to physically transform components on the target device to implement the system.

18. The system designer unit of claim 17, wherein the design modification unit automatically modifies the design in response to the strategy without user intervention.

19. The system designer unit of claim 17, wherein the design modification unit modifies the design in response to the strategy and in response to feedback solicited from the user.

* * * * *